US011861311B2

(12) United States Patent
Liu et al.

(10) Patent No.: US 11,861,311 B2
(45) Date of Patent: Jan. 2, 2024

(54) SYSTEM AND METHOD FOR KNOWLEDGE GRAPH CONSTRUCTION USING CAPSULE NEURAL NETWORK

(71) Applicants: Beijing Wodong Tianjun Information Technology Co., Ltd., Beijing (CN); JD.com American Technologies Corporation, Mountain View, CA (US)

(72) Inventors: Shizhu Liu, Mountain View, CA (US); Min Li, Mountain View, CA (US); Xiaochuan Fan, Mountain View, CA (US); Guanghan Ning, Sunnyvale, CA (US); Hui Zhou, Sunnyvale, CA (US)

(73) Assignees: BEIJING WODONG TIANJUN INFORMATION TECHNOLOGY CO., LTD., Beijing (CN); JD.COM AMERICAN TECHNOLOGIES CORPORATION, Mountain View, CA (US)

(*) Notice: Subject to any disclaimer, the term of this patent is extended or adjusted under 35 U.S.C. 154(b) by 259 days.

(21) Appl. No.: 17/116,906

(22) Filed: Dec. 9, 2020

(65) Prior Publication Data
US 2022/0180065 A1 Jun. 9, 2022

(51) Int. Cl.
G06F 40/284 (2020.01)
G06N 3/08 (2023.01)
G06N 3/04 (2023.01)

(52) U.S. Cl.
CPC .......... *G06F 40/284* (2020.01); *G06N 3/04* (2013.01); *G06N 3/08* (2013.01)

(58) Field of Classification Search
CPC .......... G06F 40/284; G06N 3/04; G06N 3/08
See application file for complete search history.

(56) References Cited

U.S. PATENT DOCUMENTS

2017/0351749 A1 12/2017 Quirk et al.
2021/0303990 A1* 9/2021 Oltramari ............... G06F 16/24

FOREIGN PATENT DOCUMENTS

CN 108874878 A 11/2018
CN 109508383 A 3/2019
(Continued)

OTHER PUBLICATIONS

Cheng, Jingwei, Fu Zhang, and Zhi Yang, "Knowledge Graph Representation Learning with Multi-Scale Capsule-Based Embedding Model Incorporating Entity Descriptions", Nov. 2020, IEEE Access, vol. 8, pp. 203028-203038. (Year: 2020).*

(Continued)

*Primary Examiner* — Daniel C Washburn
*Assistant Examiner* — James Boggs
(74) *Attorney, Agent, or Firm* — Scully, Scott, Murphy & Presser, P.C.

(57) ABSTRACT

A system for knowledge graph construction. The system includes a computing device. The computing device has a processor and a storage device storing computer executable code. The computer executable code, when executed at the processor, is configured to: define entities and relations of the knowledge graph; provide documents having sentences; convert the sentences into fix length sentence embeddings and regard the sentence embeddings as primary capsule layers; use a set transformer to learn entity capsules and relation capsules from the primary capsule layers; for each triple, project head and tail entities from entity space to the specific relation space, and determine the relation exists when the sum of the projected head entity vector and the relation vector substantially equals to the projected tail entity vector; and construct the knowledge graph using the head entity, the tail entity, and the determined relation.

17 Claims, 5 Drawing Sheets

(56) References Cited

FOREIGN PATENT DOCUMENTS

| | | |
|---|---|---|
| CN | 111506714 A | 8/2020 |
| WO | 2014/041549 A2 | 3/2014 |

OTHER PUBLICATIONS

Lee, Juho, Yoonho Lee, Jungtaek Kim, Adam R. Kosiorek, Seungjin Choi, and Yee Whye Teh, "Set Transformer: A Framework for Attention-based Permutation-Invariant Neural Networks", May 2019, Proceedings of the 36th International Conference on Machine Learning (ICML). (Year: 2019).*

Lin, Yankai, Zhiyuan Liu, Maosong Sun, Yang Liu, and Xuan Zhu, "Learning Entity and Relation Embeddings for Knowledge Graph Completion", Jan. 2015, Proceedings of the Twenty-Ninth AAAI Conference on Artificial Intelligence, pp. 2181-2187. (Year: 2015).*

Francis, Danny, Benoit Huet, and Bernard Mérialdo, "Embedding Images and Sentences in a Common Space with a Recurrent Capsule Network", Sep. 2018, 2018 International Conference on Content-Based Multimedia Indexing (CBMI), pp. 1-6. (Year: 2018).*

Lin, Zhouhan, Minwei Feng, Cícero Nogueira dos Santos, Mo Yu, Bing Xiang, Bowen Zhou, and Yoshua Bengio, "A Structured Self-attentive Sentence Embedding", Mar. 2017, ICLR 2017, pp. 1-15. (Year: 2017).*

Wang, Zhigang, and Juan-Zi Li, "Text-Enhanced Representation Learning for Knowledge Graph", Jul. 2016, Proceedings of the Twenty-Fifth International Joint Conference on Artificial Intelligence (IJCAI-16), pp. 1293-1299. (Year: 2016).*

Devlin, Jacob, Ming-Wei Chang, Kenton Lee, and Kristina Toutanova, "BERT: Pre-training of Deep Bidirectional Transformers for Language Understanding", Jun. 2019, Proceedings of NAACL-HLT 2019, pp. 4171-4186. (Year: 2019).*

Xu, Da, Chuanwei Ruan, Evren Körpeoglu, Sushant Kumar, and Kannan Achan, "Product Knowledge Graph Embedding for E-commerce", Feb. 2020, Proceedings of the 13th International Conference on Web Search and Data Mining, pp. 672-680. (Year: 2020).*

Natthawut Kertkeidkachorn, and Ryutaro Ichise, T2KG: an end-to-end system for creating knowledge graph from unstructured text, The AAAI-17 Workshop on Knowledge-Based Techniques for Problem Solving and Reasoning, 2017, 743-749.

Yankai Lin, Zhiyuan Liu, Maosong Sun, Yang Liu, and Xuan Zhu, Learning entity and relation embeddings for knowledge graph completion, Proceedings of the Twenty-Ninth AAAI Conference on Artificial Intelligence, 2015, 2181-2187.

Ryan Clancy, Ihab F. Ilyas, and Jimmy Lin, Knowledge graph construction from unstructured text with applications to fact verification and beyond, Proceedings of the Second Workshop on Fact Extraction and VERification (FEVER), 2019, 39-46.

Antonine Bordes, Nicolas Usunier, Alberto Garcia-Duran, Jason Weston, and Oksana Yakhnenko, Translating embeddings for modeling multi-relational data, Advances in Neural Information Processing Systems, 2013, 2787-2795.

Zhen Wang, Jianwen Zhang, Jianlin Feng, and Zheng Chen, Knowledge graph embedding by translating on hyperplanes, Proceedings of the Twenty-Eighth AAAI Conference on Artificial Intelligence, 2014, 1112-1119.

Guoliang Ji, Shizhu He, Liheng Xu, Kang Liu, and Jun Zhao, Knowledge graph embedding via dynamic mapping matrix, Proceedings of the 53rd Annual Meeting of the Association for Computational Linguistics and the 7th International Joint Conference on Natural Language Processing, 2015, 687-696.

Dat Quoc Nguyen, Kairit Sirts, Lizhen Qu, and Mark Johnson, STransE: a novel embedding model of entities and relationships in knowledge bases, Proceedings of NAACL HLT 2016, 2016, 460-466.

Guoliang Ji, Kang Liu, Shizhu He, and Jun Zhao, Knowledge graph completion with adaptive sparse transfer matrix, Proceedings of the Thirtieth AAAI conference on artificial intelligence, 2016, 985-991.

Bishan Yang, Wen-tau Yih, Xiaodong He, Jianfeng Gao, and Li Deng, Embedding entities and relations for learning and inference in knowledge bases, 2014, arXiv1412.6575.

Theo Trouillon, Johannes Welbl, Sebastian Riedel, eric Gaussier, and Guillaume Bouchard, Complex embeddings for simple link prediction, Proceedings of Machine Learning Research, 2016.

Dai Quoc Nguyen, Thanh Vu, Tu Dinh Nguyen, Dat Quoc Nguyen, and Dinh Phung, A capsule network-based embedding model for knowledge graph completion and search personalization, Proceedings of NAACL-HLT 2019, 2019, 2180-2189.

Sara Sabour, Nicholas Frosst, and Geoffrey E. Hinton, Dynamic routing between capsules, NIPS 2017, 2017, 3857-3867.

Geoffrey Hinton, Sara Sabour, and Nicholas Frosst, Matrix capsules with EM routing, ICLR, Jan. 15, 2018.

Yao-Huang Hubert Tsai, Nitish Srivastava, Hanlin Goh, and Ruslan Salakhutdinov, Capsules with inverted dot-product attention routing, 2020, arXiv:2002.04764.

Wei Zhao, Haiyun Peng, Steffen Eger, Erik Cambria, and Min Yang, Towards scalable and reliable capsule networks for challenging NLP applications, 2019, 1549-1559.

Zhuang Chen, and Tieyun Qian, Transfer capsule network for aspect level sentiment classification, Proceedings of the 57th Annual Meeting of the Association for Computational Linguistics, 2019, 547-556.

Wei Zhao, Jianbo Ye, Min Yang, Zeyang Lei, Soufei, and Zhou Zhao, Investigating capsule networks with dynamic routing for text classification, Proceedings of the 2018 Conference on Empirical Methods in Natural Language Processing, 2018, 3110-3119.

Juho Lee, Yoonho Lee, Jungtaek Kim, Adam R. Kosiorek, Seungjin Choi, and Yee Whye Teh, Set Transformer: a framework for attention-based permutation-invariant neural networks, Proceedings of the 36th International Conference on Machine Learning, 2019.

Ashish Vaswani et al., Attention is all you need, NOIOS 2017, 2017, 5999-6009.

Jimmy Lei Ba, Jamie Ryan Kiros, and Geoffrey E. Hinton, Layer normalization, 2016, arXiv:1607.06450.

International Search Report and Written Opinion dated Feb. 15, 2022 received in International Application No. PCT/CN2021/131477.

* cited by examiner

SYSTEM AND METHOD FOR KNOWLEDGE GRAPH CONSTRUCTION USING CAPSULE NEURAL NETWORK

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates generally to the field of natural language processing, and more particularly to systems and methods for knowledge graph construction from unstructured text using capsule neural network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Knowledge graph (KG) represents a collection of interlinked descriptions of entities—real world objects, events, situations or abstract concepts. They enable automated reasoning, e.g., the ability to infer unobserved facts from observed evidence and to make logical "hops," and render data amenable to decades of work in graph analysis. Nowadays, knowledge graphs are at the core of many of the tools that we use in our daily lives, such as voice assistants (ALEXA, SIRI or GOOGLE ASSISTANT), intuitive search applications (GOOGLE, BAIDU) and online store recommenders (AMAZON, JD.COM). Constructing and employing knowledge graphs have been proven to be effective for many computational tasks related to linguistics and social science. For instance, structured knowledge was utilized as a seed for generating interpretable and controllable texts. Nevertheless, constructing KG from unstructured text is challenging because of the system complexity of designing and integrating all sophisticated components including entity extraction and relation extraction, and missing link prediction.

Knowledge graph construction [1]-[3] generally considers the following tasks: 1) knowledge recognition, 2) entity mapping, 3) triple extraction, and 4) predicate mapping. Although these systems distill significant amount of information into knowledge graphs, they miss link prediction and inference, and their constructed KGs are far from complete.

Moreover, these existing systems and methods design and implement algorithms and models for each task respectively and connect the tasks loosely into a pipeline. Usually, such system construction process includes 3 steps: 1) training each model with annotated dataset respectively; 2) processing the unstructured text dataset and integrate the extracted entities and relations, and storing them as triples; and 3) inferencing novel knowledge based on extracted triples. Each component works independently, and mistakes at each step are propagated to the downstream steps. Moreover, the complexity of the whole system is high.

For the missing link prediction task, a plethora of methods such as TransE [4], TransH [5], TransR [2], TransD [6], STransE [7], TranSparse [8], DISMULT [9], ComplEx [10], and CapsE [11] propose to learning embedding models representing entities and relations as vectors. Based on the learned vector representations, valid triples obtain higher plausibility scores compared to invalid triples. However, except CapsE [11], these embedding models employ straightforward operators including addition, subtraction, or multiplication to encode the linear relationship between entities, which might not be sufficient. On the other hand, CapsE uses a dynamic routing algorithm to dynamically route information between two capsule layers. This is not enough to enable the high-quality construction of high level entities from low level entities due to the complex various semantic surface forms of the high level entities.

Therefore, an unaddressed need exists in the art to address the aforementioned deficiencies and inadequacies.

SUMMARY

In certain aspects, the present disclosure relates to a system for knowledge graph construction and for using the knowledge graph. In certain embodiments, the system includes a computing device. The computing device includes a processor and a storage device storing computer executable code. The computer executable code, when executed at the processor, is configured to:

provide a first number of entities, a second number of relations, and a plurality of documents, each of the plurality of documents comprising at least one sentence;

convert each of the at least one sentence into a third number of sentence embeddings, i.e., the third number of sentence embedding layers;

form the third number of primary capsule layers, each of the third number of primary capsule layers corresponding to one of the third number of sentence embeddings (in certain embodiments, the third number of sentence embedding layers are directly regarded as the third number of primary capsule layers);

use a set transformer to learn the first number of entity capsule layers and the second number of relation capsule layers from the third number of primary capsule layers, an i-th entity and a j-th entity from the first number of entity capsule layers and an m-th relation from the second number of relation capsule layers form a head entity-tail entity-relation triple, where i, j and m are positive integers, i and j may be in a range from a few hundred to a few thousands or more, and m may be in a range of 3-50;

project the i-th entity in an entity space into a m-th relation space to form the i-th projection, project the j-th entity in the entity space into the m-th relation space to form the j-th projection, and determine the m-th relation exists for the i-th entity and the j-th entity if a sum of the i-th projection (vector) and the m-relation (vector) substantially equals to the j-th projection (vector), where there are one entity space and the second number of relation spaces; and construct the knowledge graph using the determined triples, for example the i-th entity, j-th entity, m-th relation triple.

In certain embodiments, the set transformer comprises an encoder and decoder, the encoder comprises a plurality of self-attention blocks (SABs), and the decoder comprises a pooling by multi-head attention block (PMA) and a plurality of SBAs.

In certain embodiments, the computer executable code is configured to project the i-th entity and the j-th entity into the m-th relation space using a projection matrix, and the projection matrix is learned during training of the whole model defined by the computer executable code.

In certain embodiments, the computer executable code is configured to convert each of the at least one sentence into the third number of sentence embeddings by:
  encoding tokens in the at least one sentence into a plurality of one-hot vectors, each of the plurality of one-hot vectors corresponding to one of the tokens in the at least one sentence, where the tokens incudes words and optionally punctuations;
  embedding each of the plurality of one-hot vectors into a word embedding;
  performing LSTM on the word embeddings to obtain a plurality of feature vectors, each feature vector corresponding to one of the tokens in the at least one sentence; and
  performing a self-structure attention on the plurality of feature vectors to obtain the third number of sentence embeddings (sentence embedding layers).

In certain embodiments, the step of embedding each of the plurality of one-hot vectors into the word embedding is performed using word2vec.

In certain embodiments, the computer executable code is configured to convert each of the at least one sentence into the third number of sentence embeddings by:
  encoding tokens in the at least one sentence into a plurality of one-hot vectors, each of the plurality of one-hot vectors corresponding to one of the token in the at least one sentence, where the tokens incudes words and optionally punctuations;
  transforming one-hot vectors by a transformer to obtain a plurality of feature vectors, each feature vector corresponding to one of the tokens in the at least one sentence; and
  performing a self-structure attention on the plurality of feature vectors to obtain the third number of sentence embeddings.

In certain embodiments, the transformer comprises bidirectional encoder representations from transformers (BERT).

In certain embodiments, the plurality of documents are product descriptions, the entities are a plurality of products, the relations comprise a fitting relation between the plurality of products, and the computer executable code is further configured to:
  upon receiving a query product, query the knowledge graph using the query product to obtain a query entity corresponding to the query product and a fitting entity having the fitting relation to the query entity; and
    provide a fitting product to the query product, where the fitting product corresponds to the fitting entity.

The number of the fitting entity may be one or more. In certain embodiments, the query product and several fitting product forms a suit of garments.

In certain embodiments, the plurality of documents are product question and answers, the entities are a plurality of product questions and a plurality of product answers, the relations comprise a true relation linking one of the plurality of product answers to one of the plurality of product questions, and the computer executable code is further configured to:
  upon receiving a product question, query the knowledge graph using the product question to obtain one of the product question entities, and obtain one of the product answer entities having the true relation to the one of the product question entities; and
  provide an answer to the product question, where the answer corresponds to the one of the product answer entities.

In certain embodiments, the plurality of documents are product service requests and answers, the entities are a plurality of product service request entities and a plurality of product service answer entities, the relations comprise a true relation linking one of the plurality of product service request entities to one of the plurality of product service answer entities, and the computer executable code is further configured to:
  upon receiving a product service request, query the knowledge graph using the product service request to obtain one of the product service request entities, and obtain one of the product service answer entities having the true relation to the one of the product service request entities; and
  provide an answer to the product service request, where the answer corresponds to the one of the product service answer entities.

In certain aspects, the present disclosure relates to a method. In certain embodiments, the method includes:
  providing, by a computing device, a first number of entities, a second number of relations, and a plurality of documents, each of the plurality of documents comprising at least one sentence;
  converting, by the computing device, each of the at least one sentence into a third number of sentence embeddings, i.e., the third number of sentence embedding layers;
  forming, by the computing device, the third number of primary capsule layers, each of the third number of primary capsule layers corresponding to one of the third number of sentence embeddings (in certain embodiments, the third number of sentence embedding layers are directly regarded as the third number of primary capsule layers);
  using, by the computing device, a set transformer to learn the first number of entity capsule layers and the second number of relation capsule layers from the third number of primary capsule layers, an i-th entity and a j-th entity from the first number of entity capsule layers and an m-th relation from the second number of relation capsule layers form a head entity-tail entity-relation triple;
  projecting, by the computing device, the i-th entity in an entity space into an m-th relation space to form the i-th projection, projecting the j-th entity in the entity space into the m-th relation space to form the j-th projection, and determining the m-th relation exists for the i-th entity and the j-th entity if a sum of the i-th projection (vector) and the m-relation (vector) substantially equals to the j-th projection (vector); and
  construct the knowledge graph using the determined triples where the head entity and the tail entity in the triple have the corresponding relation in the triple.

In certain embodiments, the set transformer comprises an encoder and decoder, the encoder comprises a plurality of self-attention blocks (SABs), and the decoder comprises a pooling by multi-head attention block (PMA) and a plurality of SBAs.

In certain embodiments, the step of converting each of the at least one sentence into a third number of sentence embeddings comprises:

encoding tokens in the at least one sentence into a plurality of one-hot vectors, each of the plurality of one-hot vectors corresponding to one of the tokens in the at least one sentence, where the tokens include words and optionally punctuations;

embedding each of the plurality of one-hot vectors into a word embedding;

performing LSTM on the word embeddings to obtain a plurality of feature vectors, each feature vector corresponding to one of the tokens in the at least one sentence; and performing a self-structure attention on the plurality of feature vectors to obtain the third number of sentence embeddings, i.e., the third number of sentence embedding layers.

In certain embodiments, the step of converting each of the at least one sentence into a third number of sentence embeddings comprises:

encoding tokens in the at least one sentence into a plurality of one-hot vectors, each of the plurality of one-hot vectors corresponding to one of the tokens in the at least one sentence, where the tokens include words and punctuations;

transforming one-hot vectors by a transformer to obtain a plurality of feature vectors, each feature vector corresponding to one of the words in the at least one sentence; and performing a self-structure attention on the plurality of feature vectors to obtain the third number of sentence embeddings, i.e., the third number of sentence embedding layers.

In certain embodiments, the plurality of documents are product descriptions such as garment fittings, the entities are a plurality of products, the relations comprise a fitting relation between the plurality of products, and the method further comprises:

upon receiving a query product, querying the knowledge graph using the query product to obtain a query entity corresponding to the query product and at least one fitting entity having the fitting relation to the query entity; and providing a fitting product corresponding to the at least one fitting entity.

In certain embodiments, the plurality of documents are product questions and answers, the entities are a plurality of product questions and a plurality of product answers, the relations comprise a true relation linking one of the plurality of product answers to one of the plurality of product questions, and the method further comprises:

upon receiving a product question, querying the knowledge graph using the product question to obtain one of the product question entities and obtain one of the product answer entities having the true relation to the one of the product question entities; and providing an answer to the product question, where the answer corresponds to the one of product answer entities.

In certain embodiments, the plurality of documents are product service requests and answers, the entities are a plurality of product service request entities and a plurality of product service answer entities, the relations comprise a true relation linking one of the plurality of product service request entities to one of the plurality of product service answer entities, and the method further comprises:

upon receiving a product service request, querying the knowledge graph using the product service request to obtain one of the product service request entities corresponding to the product service request, and obtain one of the product service answer entities having the true relation to the one of the product service request entities; and providing an answer to the product service request, where the answer corresponds to the one of the product service answer entities.

In certain aspects, the present disclosure relates to a non-transitory computer readable medium storing computer executable code. In certain embodiments, the computer executable code, when executed at a processor of a computing device, is configured to perform the method described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
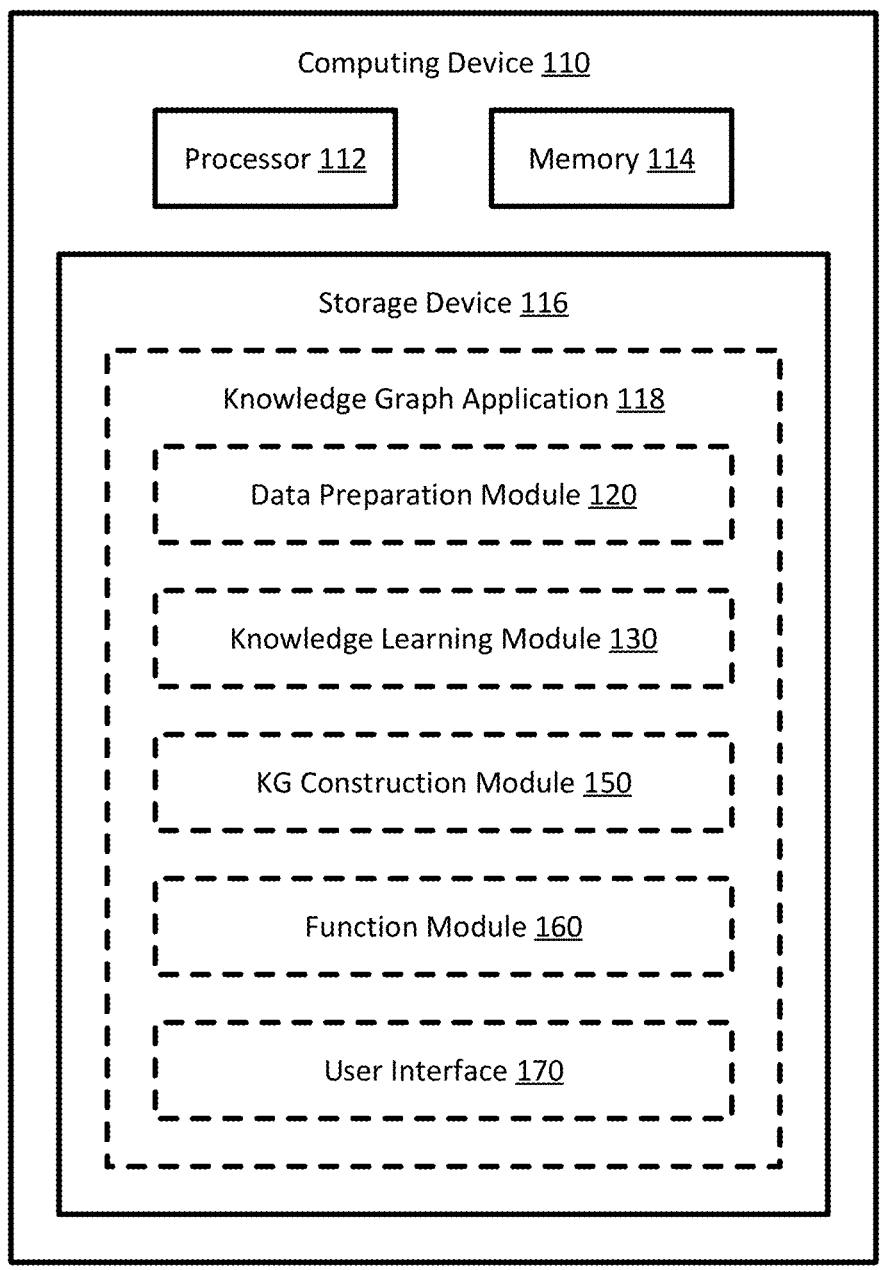
FIG. 1 schematically depicts a system for knowledge graph construction and utilization according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views.

The terms used in this specification generally have their ordinary meanings in the art, within the context of the disclosure, and in the specific context where each term is used. Unless otherwise defined, all technical and scientific terms used herein have the same meaning as commonly understood by one of ordinary skill in the art to which this disclosure pertains. In the case of conflict, the present document, including definitions will control. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used in the description herein and throughout the claims that follow, the meaning of "a," "an," and "the" includes plural reference unless the context clearly dictates otherwise. As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the present disclosure provides a unified framework integrating the knowledge recognizing, mapping, triple extraction and missing link prediction and inference. The unified framework inventively combines capsule network, set transformer, and entity and relation spaces to construct knowledge graph (KG) from unstructured text. The disclosure represents entities and relationships in knowledge graph with capsule neurons, learns the embeddings with the set transformers and predicts missing links in the unified framework. The set transformer is responsible for constructing high level entities and relations from low level entities and relations. The capsule network and set transformers enable the system to effectively handle the various semantic surface forms and the interaction between complex entities and relations. Based on this representation, the disclosure further provides a learning strategy, which provides the corresponding neural network the capability of automatically learning the representation of entities and relationships in the knowledge graph simultaneously. The use of the capsule network, the set transformer, and the separate entity and relation spaces are advantages over related art in KG construction.

FIG. 1 schematically depicts a system for knowledge graph construction and utilization according to certain embodiments of the present disclosure. As shown in FIG. 1, the system 100 includes a computing device 110. In certain embodiments, the computing device 110 may be a server computer, a cluster, a cloud computer, a general-purpose computer, a headless computer, or a specialized computer, which generates a content plan. The computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. In certain embodiments, the processor 112 can execute an operating system (OS) or other applications of the computing device 110. In certain embodiments, the computing device 110 may have more than one CPU as the processor, such as two CPUs, four CPUs, eight CPUs, or any suitable number of CPUs. The memory 114 may be a volatile memory, such as the random-access memory (RAM), for storing the data and information during the operation of the computing device 110. In certain embodiments, the memory 114 may be a volatile memory array. In certain embodiments, the computing device 110 may run on more than one processor 112 and/or more than one memory 114. The storage device 116 is a non-volatile data storage media or device. Examples of the storage device 116 may include flash memory, memory cards, USB drives, solid state drives, or other types of non-volatile storage devices such as hard drives, floppy disks, optical drives, or any other types of data storage devices. In certain embodiments, the computing device 110 may have more than one storage device 116. In certain embodiments, the computing device 110 may also include a remote storage device 116.

The storage device 116 stores computer executable code. The computer executable code includes a knowledge graph application 118. The knowledge graph application 118 includes the code or instructions which, when executed at the processor 112, generates knowledges for knowledge graph construction, constructs knowledge graph, and utilizes the knowledge graph to perform related functions. In certain embodiments, the knowledge graph application 118 may not be executable code, but in a form of circuit corresponding to the function of the executable code. By providing a circuit instead of executable code, the operation speed of the knowledge graph application 118 is greatly improved. In certain embodiments, as shown in FIG. 1, the knowledge graph application 118 includes, among other things, a data preparation module 120, a knowledge learning module 130, a knowledge graph construction module 150, a function module 160, and a user interface 170.

The data preparation module 120 is configured to prepare training data for training the knowledge learning module 130 and provide inference data to the knowledge learning module 130 to infer knowledge, and send the training data or the inference data to the knowledge learning module 130. For each knowledge graph, a large number of entities and a small number of relations are predefined. The training data includes training documents, each training document may include one or more sentences, each sentence may have labeled entities and relations between the labeled entities, when available. The training sentences, the entity labels, and the relation labels can be used as input to train the knowledge learning module 130. After well training, the well-trained knowledge learning module 130 can be used for entity and label prediction and inference. Accordingly, the data preparation module 120 is further configured to prepare inference data. The inference data includes a large number of documents, and each documents may have one or more sentences. The sentences are not labeled with entities and relations. In certain embodiments, the training data and the inference data are the same type, such as product description data, customer comments data, or customer service data.

Figure 2:
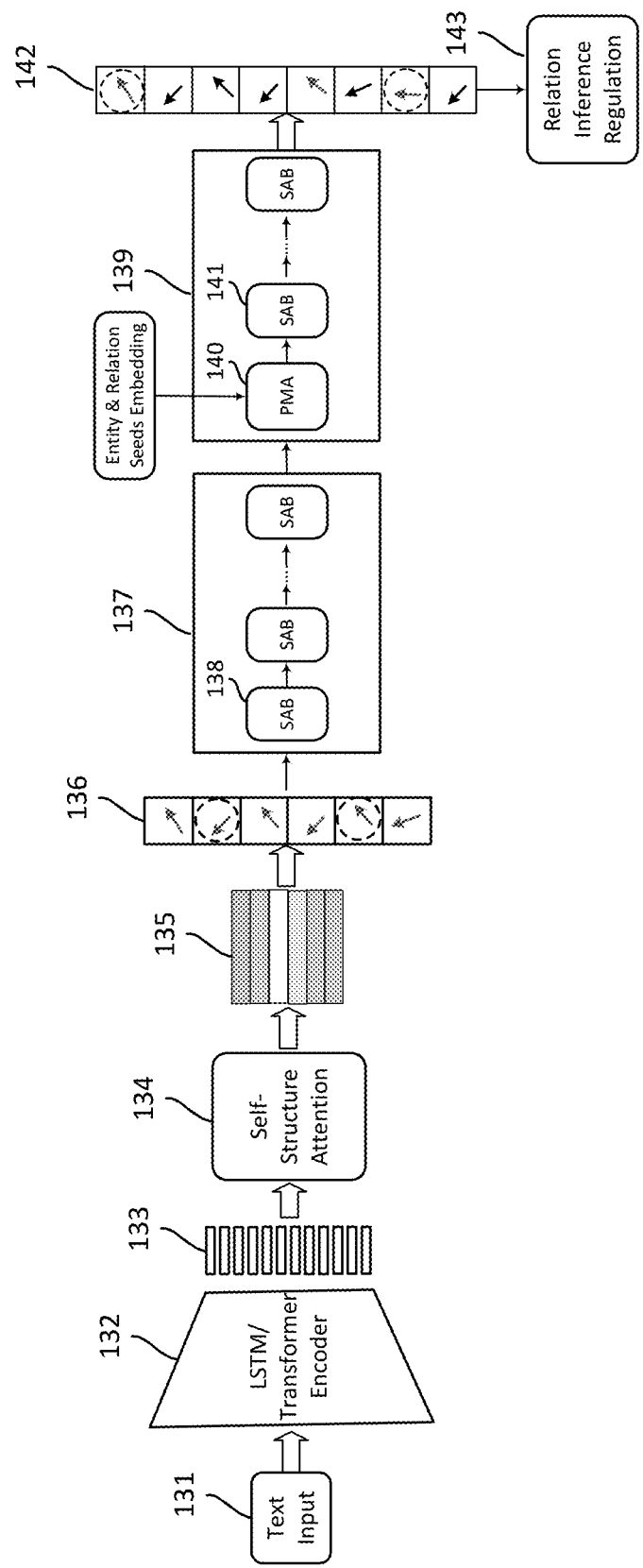
FIG. 2 schematically depicts an architecture of the knowledge learning module according to certain embodiments of the present disclosure.

The knowledge learning module 130 is configured to, upon receiving the training data from the data preparation module 120, perform training, and after well-trained and upon receiving the inference data, infer entities and relations, and send the inferred entities and relations to the knowledge graph construction module 150. FIG. 2 schematically depicts a detailed architecture of the knowledge learning module 130 according to certain embodiments of the present disclosure.

As shown in FIG. 2, an text input 131 is inputted. The text input 131, for example, is a sentence of the training data or inference data. The sentence includes a number of sequential words, and the number of the words in each sentence in the training data or the inference data may be different. The knowledge learning module 130 is configured to convert the sentence into one-hot encoding representations $\{w_1, w_2, \ldots w_i, \ldots, w_T\}$, where T is the number of tokens in the sentence, and the tokens include words and punctuations.

In certain embodiments, the knowledge learning module 130 is configured to embed the one-hot representations to a sequence of word embedding: $E=\{e_1, e_2, \ldots, e_i, \ldots, e_T\}$. Each one-hot word representation has a corresponding word embedding. Here $e_i$ is a vector standing for a d dimensional word embedding for the i-th word in the document. To get the word embedding representation E, the knowledge learning module 130 first looks up the embedding matrix $W^{wrd} \in \mathbb{R}^{d^{emb}|V|}$, where V is a fixed-sized vocabulary, and $d^{emb}$ is the size of word embedding. The matrix $W^{wrd}$ is the parameters to be learned with model, and $d^{emb}$ is a hyper-parameter to be chosen by the user. The knowledge learning module 130 transforms a word $w_i$ into its word embedding $e_i$ by using matrix-vector product: $e_i=W^{wrd}v_i$, where $v_i$ is a vector of word $w_i$ index in V. In certain embodiments, the word embedding layer may be word2vec. After word embedding, the knowledge learning module 130 is further configured to feed the word embeddings $\{e_1, e_2, \ldots, e_i, \ldots, e_T\}$ to the long Short-term memory (LSTM) encoder 132, to capture dependency between words in the sequence, and the output from the LSTM encoder 132 is a set of feature vectors $\{u_1, u_2, \ldots, u_i, \ldots, u_T\}$, where $u_i$ encodes the semantics of the i-th word in the give sentence. The LSTM encoder 132 may be a unidirectional LSTM or a bidirectional LSTM.

Alternatively, instead of using the LSTM layer, the knowledge learning module 130 is configured to use a transformer encoder to capture dependency between words in the sentence, which may use an attention mechanism. Specifically, the one-hot encoding representations $\{w_1, w_2, \ldots, w_i, \ldots, w_T\}$ are inputted to the transformer encoder 132, and the transformer encoder 132 outputs the set of feature vectors 133 $\{u_1, u_2, \ldots, u_i, \ldots, u_T\}$. In certain embodiments, the transformer encoder 132 is bidirectional encoder representations from transformers (BERT).

The set of feature vectors 133 $\{u_1, u_2, \ldots, u_i, \ldots, u_T\}$ are inputted to the self-structure attention 134, and the self-structure attention 134 converts the feature vectors to fixed length sentence embedding 135, which are directly used as fixed length of primary capsules 142. In particular, the self-structure attention 134 takes the whole feature embedding $U=\{u_1, u_2, \ldots, u_i, \ldots, u_T\}$ as input, and outputs a vector of weights A:

$$A = \text{softmax}(W_{s2} \tanh(W_{s1} U^T)) \qquad (1).$$

Here $W_{s1}$ is a weight matrix with a shape of t-by-u (unidirectional LSTM encoder 132) or t-by-2u (bidirectional LSTM encoder 132), where t or T is the total number of tokens, u is the number of hidden state vectors of the LSTM encoder 132, $W_{s2}$ is an r-by-t weight matrix, and r is a hyperparameter that can be set arbitrarily. In this setting, the disclosure uses a softmax classifier to predict $\hat{y}$ label from a discrete classes Y for the sentence S. The classifier takes the word embeddings E as input, and U is hidden state vector of the LSTM encoder 132:

$$\hat{p}(y|S) = \text{softmax}(A^{(S)}U, b^{(S)}) \quad (2), \text{ and}$$

$$\hat{y} = \underset{y}{\text{argmax}}\hat{p}(y|S). \quad (3)$$

Here $A^{(S)}U$ is the fixed length sentence embedding 135, and b(s) is a bias parameter.

The fixed length sentence embedding 135 is in a form of 2D matrix, and is regarded as the primary capsules 136. Each row of the matrix attends part of the sentence. After obtaining the primary capsules 136, the knowledge learning module 130 is further configured to use a set transformer mechanism to learn the relationship between the primary capsules 136 and abstract entity and relation capsules, and obtain entity/relation capsules 142. As shown in FIG. 2, the set transformer include an encoder 137 and a decoder 139. The encoder 137 includes multiple self-attention blocks (SABs) 138, and the decoder 139 includes a pooling by multi-head attention (PMA) block 140 and multiple SABs 141. The encoder 137 encodes the primary capsules 136 to obtain encoded primary capsules, and the decoder 139 uses the encoded primary capsules and the entity/relation seeds embedding to calculate entity/relation capsules. Kindly note that the value of the predefined number of entity/relation seeds embedding may be set randomly to initialize the training, and the number of entity/relation seeds equals to the number of obtained entity/relation capsules. There is no need to input the entity/relation seeds embedding in the following training process because information of the entity/relation seeds embedding is stored in the model.

SAB is a special type of multi-head attention block (MAB). MAB is an adaptation of the encoder block of the Transformer [19] without positional encoding and dropout. The attention function can be described as mapping a query and a set of key-value pairs to an output, where the query, keys, values, and output are all vectors. The output is computed as a weighted sum of the values, where the weight assigned to each value is computed by a compatibility function of the query with the corresponding key. The input consists of queries and keys of dimension dk, and values of dimension $d_{kv}$:

$$\text{Attention}(Q, K, V) = \text{softmax}\left(\frac{QK^T}{\sqrt{d_k}}\right)V, \quad (4)$$

and $$\text{MultiHead}(Q, K, V) = \text{Concat}(\text{head}_1, \ldots \text{head}_h)W^O, \quad (5)$$

where $\text{head}_i = \text{Attention}(QW_i^Q, KW_i^K, VW_i^V)$, and the projections are parameter matrices $W_i^Q \Sigma \mathbb{R}^{d_{model} \times d_k}$, $W_i^K \Sigma \mathbb{R}^{d_{model} \times d_k}$, and $W_i^K \Sigma \mathbb{R}^{d_{model} \times d_k}$, $W_i^V \Sigma \mathbb{R}^{d_{model} \times d_k}$, $W_i^O \Sigma \mathbb{R}^{d_{model} \times d_k}$.

$$MAB(X,Y) = \text{LayerNorm}(H + rFF(H)) \quad (6),$$

where H=LayerNorm(X+Multihead(X, Y, Y)). rFF is any row-wise feedforward layer (i.e., it processes each instance independently and identically), and LayerNorm is layer normalization [20].

$$SAB(X) := MAB(X,X) \quad (7).$$

PMA with seed assumption vectors is defined as:

$$PMA_k(Z) = MAB(S, rFF(Z)) \quad (8),$$

where k refer to the k assumption entity or relation vectors, and Z refer to the input set vectors.

After obtaining the entity/relation capsules 142, the knowledge learning module 130 is further configured to regulate the model by relation inference regulation 143. In particular, during the learning process, the knowledge learning module 130 tries to optimize the loss function combing the classification loss and relation inference loss:

$$L = L_c + L_r \quad (9).$$

For the classification loss, the disclosure uses the cross-entropy loss. For multiclass classification, the disclosure uses multiclass cross-entropy loss. For multilabel classification, the disclosure uses binary cross-entropy loss.

As a novel feature, the knowledge learning module 130 is configured to model entities and relations in distinct spaces, i.e., entity space and relation spaces, and performs translation in relation space. For each triple (h, r, t), entities embeddings are set as h, t E Rk and relation embedding is set as r E Rd. For each relation r, the disclosure sets a projection matrix $M_r \Sigma \mathbb{R}^{k \times d}$ which may project entities from entity space to relation space, and is learned during training.

With the mapping matrix, the disclosure defines the projected vectors of entities as:

$$h_r = hM_r \quad (10), \text{ and}$$

$$t_r = tM_r \quad (11).$$

The score function is correspondingly defined as:

$$f_r(h,t) = \|h_r + r - t_r\|_2^2 \quad (12).$$

The disclosure defines the following margin-based score function as objective for training:

$$L_r = \Sigma_{(h,r,t) \in S} \Sigma_{(h',r',t') \in S'} \max(0, f_r(h,t) + \gamma - f_r(h',t')) \quad (13),$$

where max(x, y) aims to get the maximum between x and y, 7 is the margin, S is the set of correct triples and S' is the set of incorrect triples.

Figure 3:
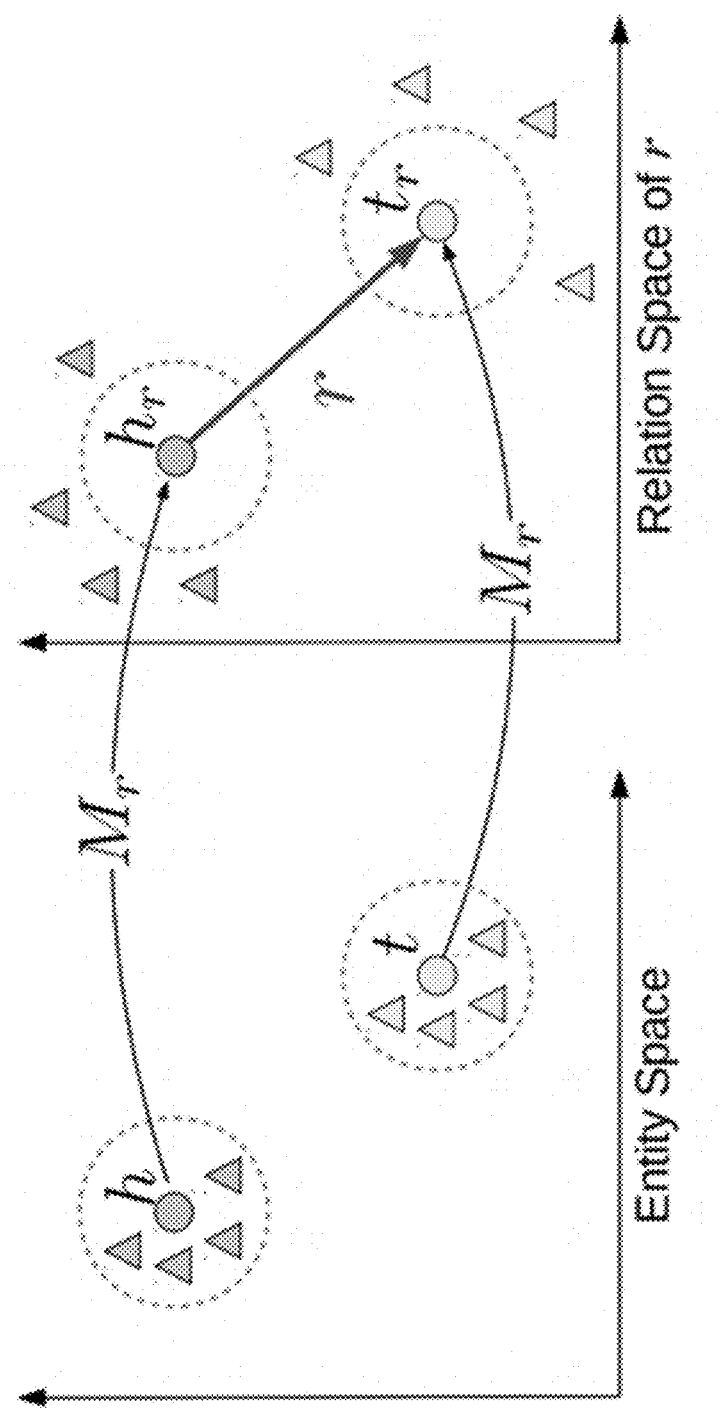
FIG. 3 schematically depicts relation inference mechanism according to certain embodiments of the present disclosure.

FIG. 3 schematically depicts the basic idea of relation inference mechanism according to certain embodiments of the present disclosure. As shown in FIG. 3, for each triple (h, r, t), entities in the entity space are first projected into r-relation space as $h_r$ and $t_r$ with operation $M_r$, and then $h_r + r = t_r$. The relation-specific projection can make the head/tail entities that actually hold the relation (denoted as solid circles) close with each other, and also get far away from those that do not hold the relation (denoted as solid triangles). In certain embodiments, the closeness is predefined, for example, within 5% of the value of the relation vector r. After obtaining the head-tail-relation triples, the knowledge learning module 130 is further configured to send the triples to the knowledge graph construction module 150.

In brief, the knowledge learning module 130 is configured to train the learning model by inputting text, encoding the text to primary capsule layers, performing set transformer to obtain entity/relation capsule layers, performing relation inference to infer relations, comparing the inferred relations with the labeled relations (calculating losses), so as to adjust parameters for encoding, set transformer, and the projection matrix. After training, the knowledge learning module 130 can use the newly inputted text to infer relations, and the newly inferred relations are sent to the knowledge graph construction module 150.

The knowledge graph construction module 150 is configured to, upon receiving the triples, construct a new knowledge graph or complete an available knowledge graph using the obtained triples. The constructed or completed knowledge graph is accessible to the function module 160.

The function module 160 is configured to, when the knowledge graph is constructed or is substantially complete, use the knowledge graph to perform certain functions. The function module 160 may be stored in the computing device 110 or any other computing devices that are in communication with the computing device 110. In certain embodiments, the function is garment recommendation, and the knowledge graph is constructed using garment fitting documents. The knowledge graph includes garment entities, the edges represent fitting, and the garments belonging to a same suit are linked by the edges. When a customer purchases a garment in an e-commerce platform, the function module 160 is configured to query the knowledge graph using the purchased garment, obtain garments that fit with the query garment, and recommend the queried garments to the customer.

In certain embodiments, the function is to provide answers to customer questions, and the knowledge graph is constructed using customer question and answer documents. The knowledge graph includes question entities and answer entities, the edges represent a suitable answer to a question. When a customer purchases a product in an e-commerce platform, the function module 160 is configured to query the knowledge graph using the question, obtain answers tailored to the question, and provide the answer to the customer. In certain embodiments, the knowledge graph include subgraphs corresponding to different type of products, such that the answers provided to the customer can be more accurate.

In certain embodiments, the function is to provide service to customer requests, and the knowledge graph is constructed using customer service documents. The knowledge graph includes service request entities and service entities, and optionally a link to a service provider for a specific service. The edges represent a suitable service to a service request. When a customer seeks for a service of a product, the function module 160 is configured to query the knowledge graph using the service request, obtain a service tailored to the request, and links the service provider to the request. In certain embodiments, the function may also include making a service appointment for the customer with the service provider. In certain embodiments, the function may further include a trouble shooting process. The knowledge graph includes trouble shooting entities related to service request, and the function module 160 is configured to provide the trouble shooting instruction corresponding to the service request. The customer may be able to solve his problem according to provided instructions before seeking help from the service provider.

The user interface 170 is configured to provide a user interface or graphic user interface on the computing device 110 or a remote terminal. In certain embodiments, the user or the administrator of the system can configure parameters for the computing device 110, especially the parameters used in the knowledge graph application 118, which include, for example, hyperparameters of the knowledge learning module 130, the number of primary capsule layers, the number of SABs in the encoder 137, the number of SABs in the decoder 139, the entities and relations, etc.

Figure 4:
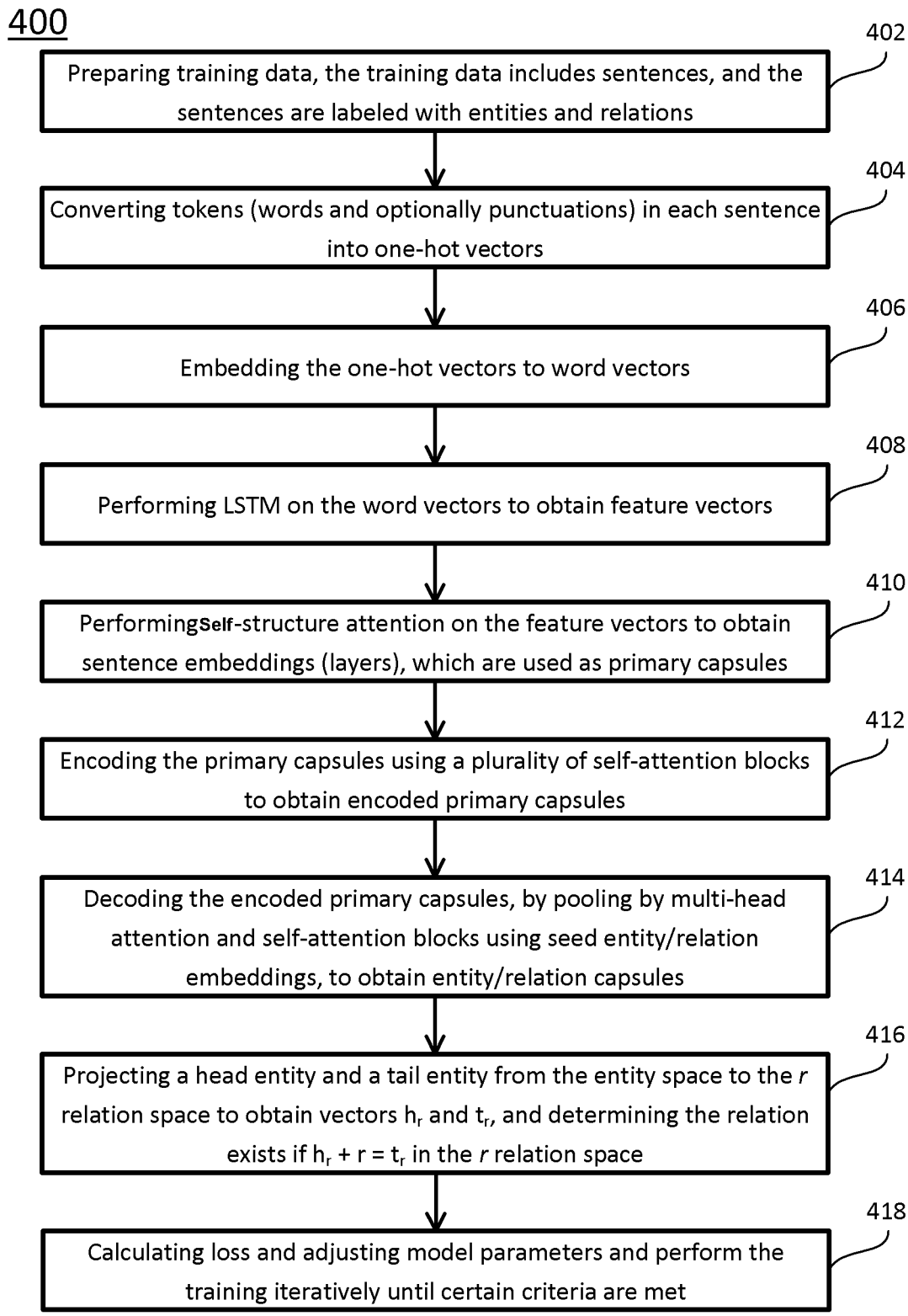
FIG. 4 schematically depicts training of knowledge graph learning according to certain embodiments of the present disclosure.

FIG. 4 schematically depicts training of knowledge graph learning according to certain embodiments of the present disclosure. In certain embodiments, the method 400 as shown in FIG. 4 may be implemented on a computing device 110 as shown in FIG. 1. It should be particularly noted that, unless otherwise stated in the present disclosure, the steps of the method may be arranged in a different sequential order, and are thus not limited to the sequential order as shown in FIG. 4.

At procedure 402, the data preparation module 120 prepares training data for constructing or completing a knowledge graph, and sends the training data to the knowledge learning module 130. The entities and labels for the knowledge graph are predefined. The training data includes a number of documents, and each documents have one or more sentences. The entities and the relations in each sentence are labeled. The data preparation module 120 may provide the training data for training by batches, and each batch includes, for example, 10 labeled sentences.

At procedure 404, upon receiving the batch of training data, the knowledge learning module 130 coverts the T number of tokens (including words and punctuations) in each of the sentences into sequential one-hot encoding representations $\{w_1, w_2, \ldots, w_i, \ldots, w_T\}$, and sends the one-hot encoding representations to a word embedding module of the knowledge learning module 130. Each sentence in the training is processed substantially independently, however, the information from the batch of sentences are used collaboratively to adjust model parameters in each iteration of training.

At procedure 406, the word embedding module embeds the sequential one-hot encoding representations $\{w_1, w_2, \ldots, w_i, \ldots, w_T\}$ into a sequence of word embeddings $\{e_1, e_2, \ldots, e_i, \ldots, e_T\}$, and sends the sequence of word embeddings to the LSTM encoder 132. The word embeddings are extracted from a vocabulary and each of the word embedding has predefined dimensions. The word embedding parameters are to be learned during the training. The word embedding may be word2vec.

At procedure 408, upon receiving the word embeddings, the LSTM encoder 132 encodes the word embeddings $\{e_1, e_2, \ldots, e_i, \ldots, e_T\}$ to the feature vectors $\{u_1, u_2, \ldots, u_i, \ldots, u_T\}$, and sends the feature vectors to the self-structure attention 134. The feature vectors are hidden vectors of the LSTM encoder 132, and include the feature of the words and the semantic relation of the words in the sentence. In certain embodiments, the procedures 406 and 408 may also be performed by a transformer, which learns the feature vectors $\{u_1, u_2, \ldots, u_i, \ldots, u_T\}$ directly from the one-hot vectors $\{w_1, w_2, \ldots, w_i, \ldots, w_T\}$. In certain embodiments, the transformer is BERT.

At procedure 410, upon receiving the feature vectors, the self-structure attention 134 converts the feature vectors $\{u_1, u_2, \ldots, u_i, \ldots, u_T\}$ into sentence embedding 135. The sentence embedding 135 is regarded as the primary capsules 136, and the primary capsules 136 is subjected to the encoder 137. The sentence embedding 135 has a fixed length independent from the lengths of the sentences. The sentence embeddings 135 are used as the primary capsules 136, which has a fixed number of primary capsules. The importance of the capsules in the primary capsules 136 may be different for the different sentences.

At procedure 412, the encoder 137 encodes the primary capsules 136 to obtain encoded primary capsules, and sends the encoded primary capsules to the decoder 139. The encoder 137 includes multiple SABs 138, and the number of SABs 138 may vary depending on the knowledge to be learned.

At procedure 414, the PMA 140 of the decoder 139 processes the encoded primary capsules and the seed entity/relation embeddings, and after further application of SABs 141, obtains the entity/relation capsules. The seed entity/relation embeddings defines all the entities and relations for the knowledge graph to be constructed, and the total number of entity/relation capsules is the total number of predefined number of entities and relations. In certain embodiments, the seed entity/relation embeddings may be random valued embeddings or empty embeddings. The seed entity/relation embeddings are used as input during the initiation of the training, and there is no need to input the seed entity/relation embeddings after the initiation.

At procedure 416, after obtaining the entity/relation capsules, for each head entity-relation-tail entity triple, the knowledge learning module 130 projects the head entity and the tail entity from the entity space to the corresponding relation space using the operation $M_r$ to obtain the projected head entity $h_r$ and the projected tail entity $t_r$, and if $h_r+r=t_r$, and determines that the relation between the head entity and the tail entity exist. In certain embodiments, the value of the operation $M_r$ may be random or empty during initiation of the training, and will be learned during the following training process. Kindly note that there is one entity space for all the entities, and each of the relations has its own relation space.

At procedure 418, the knowledge learning module 130 calculates loss based on the obtained head entity-tail entity relations, adjusts the parameters of the models based on the loss, and runs another iteration of training to minimize the loss.

The procedures 402 to 418 may be performed iteratively for the same batch of training data for a predetermined iterations, or until the parameters converge. Then the knowledge learning module 130 uses another batch of training data for the training. After training using all the training data is completed, the models are well trained. In certain embodiments, the system 100 may use certain criteria to evaluate the training, and the models are regarded as being well-trained if the criteria are met.

Figure 5:
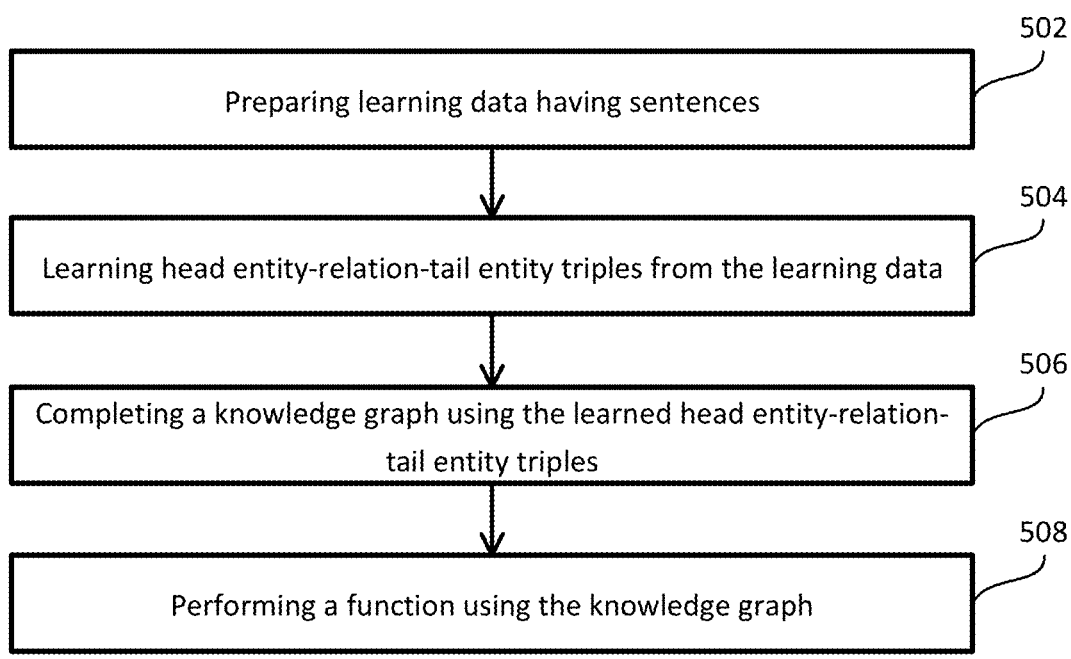
FIG. 5 schematically depicts construction or completion of a knowledge graph and using the knowledge graph according to certain embodiments of the present disclosure.

FIG. 5 schematically depicts constructing or completing a knowledge graph and using the knowledge graph according to certain embodiments of the present disclosure. In certain embodiments, the method 500 as shown in FIG. 5 may be implemented on a computing device 110 as shown in FIG. 1. It should be particularly noted that, unless otherwise stated in the present disclosure, the steps of the method may be arranged in a different sequential order, and are thus not limited to the sequential order as shown in FIG. 5.

At procedure 502, the data preparation module 120 prepares learning data for constructing or completing the knowledge graph, and sends the learning data to the knowledge learning module 130. The learning data includes a large number of documents, and each document has one or more sentences. The learning data may provide the learning data by batches, and each batch may include, for example, 10 sentences.

At procedure 504, the knowledge learning module 130 converts the words in each sentence to one-hot vectors, embeds the one-hot vectors into sequential word embeddings, encodes the word embeddings by the LSTM to obtain feature vectors, perform self-structure attention on the feature vectors to obtain fixed length sentence embeddings, regards the fixed length sentence embeddings as primary capsules, and perform set transformer to the primary capsules to obtain entity/relation capsules, and extracts head entity-relation-tail entity information from the obtained entity/relation capsules using relation inferences. The procedure 504 substantially corresponds to the procedures 404-416. But there is no ground truth entity and relation labels for comparison, and there is no need to adjust model parameters. By the above process, the entities and relations from each sentence can be learned by one operation of the learning process, and there is no need to run one round of learning for each triple, or each entity, or each relation. Therefore, the learning process is efficient.

At procedure 506, after learning head entity-relation-tail entity triples from the learning data, the KG construction module 150 constructs or completes the knowledge graph using the learned triples. The constructed or completed knowledge graph is available to the function module 160.

At procedure 508, the function module 160 uses the knowledge graph to perform a function. In certain embodiments, the knowledge graph is about garment fitting, each entity is a garment, and the relations or edges indicate whether the garments belong to the same suit of garments. When a customer reviews or purchases a garment from an e-commerce platform, the function module 160 uses the reviewed or purchased garment as a query to query the knowledge graph, finds the garments that fit with the reviewed or purchased garment, and recommends the garments found from the knowledge graph to the customer, for example, by pushing a message of the garments to the customer, or displaying the recommended garments to the customer when he enters the e-commerce platform.

In certain embodiments, the knowledge graph is about question and answers of products, the entities include products and features of the products, and the relations or edges are whether the products have the corresponding feature. The function module 160 provides a question and answer interface, such as a chat box, to customers. When a customer is interested in a product and asked questions about a feature of the product, the function module 160 uses the product and the question as query against the knowledge graph to obtain corresponding feature of the product, and includes the corresponding feature in the answer to the customer.

In certain embodiments, the knowledge graph is about service requests of products, the entities include products, service request on the products, and service solutions to the service requests. The relations or edges link the product entities and the corresponding service solutions. The service solution may include instructions to a service request or a contact of service providers to the service request. The function module 160 provides a service interface to customers. When a customer has a service request for his purchased product, he may describe the service request via the interface, the function module 160 finds solutions to the service request, and includes the query result as the answer to the customer. The answer may instruct the customer to trouble shooting the service problem by himself, or provide the customer with a contact information of a customer service provider. In certain embodiments, the function module 160 may further schedule an appointment for the service between the customer and the service provider.

In certain aspects, the present disclosure is related to a non-transitory computer readable medium storing computer executable code. The code, when executed at a processor 112 of the computing device 110, may perform the methods as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

Certain embodiments of the present disclosure, among other things, have the following advantages. (1) Capsule network[12]-[14] is firstly proposed to achieve viewpoint equivariance in image classification tackling the bag of feature problem due to the use of pooling operation in CNNs. They can generalize to recognize the same objects with different viewpoints in images through routing algorithms between low level features and high level features. The present disclosure uses such generalization capability of the capsule network to learn hierarchical relationships and complex patterns and abstract away from different surface realizations in NLP applications, and applies the capsule network in solving knowledge graph construction from unstructured text. (2) Set transformer aims to solve set input problems which satisfy two properties: first, the output of model remains the same when the order of input instances changes, and second, the model can take input of any sizes. Set transformers capture the pairwise and high order interactions between elements in the set through a self-attention mechanism. Accordingly, the present disclosure uses the feature of the set transformer to solve complex problems such as knowledge recognition and missing link prediction. (3) The disclosure takes the advantages of the self-attention mechanism in set transformer to aggregate features, which is advantageous to effectively capture the interaction between entities and relations and learn more accurate representations. The incorporation of set transformer to process text is novel, in contrast to using set transformer to process images. (4) Given the fact that entities typically are sophisticated and contain multiple aspects with relations centered on corresponding aspects, projecting entities and relations into the same embedding space cannot differentiate the various aspect of entities and their relations effectively. To solve the problem, the disclosure models entity and relation embeddings into separate entity and relation spaces based on capsule net and set transformer. The disclosure then performs translation of entities to relation spaces during the learning process and uses this as a regularizer. The representation of the entities and relations by vectors are also novel. (5) The system provides a unified and integrated framework. The framework uses an end-to-end capsule neural network to learn all the representations at once. The three components of the framework includes: a) a text encoder such as LSTM or transformer with self-structure attention to encode the raw text into primary capsules; b) a set transformer mechanism to learn the relationship between the primary capsules and abstract entity and relation capsules; c) during the learning process, the disclosure uses the relation inference as the regularization.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

[1] Natthawut Kertkeidkachorn, and Ryutaro Ichise, T2KG: an end-to-end system for creating knowledge graph from unstructured text, The AAAI-17 Workshop on Knowledge-Based Techniques for Problem Solving and Reasoning, 2017, 743-749.
[2] Yankai Lin, Zhiyuan Liu, Maosong Sun, Yang Liu, and Xuan Zhu, Learning entity and relation embeddings for knowledge graph completion, Proceedings of the Twenty-Ninth AAAI Conference on Artificial Intelligence, 2015, 2181-2187.
[3] Ryan Clancy, Ihab F. Ilyas, and Jimmy Lin, Knowledge graph construction from unstructured text with applications to fact verification and beyond, Proceedings of the Second Workshop on Fact Extraction and VERification (FEVER), 2019, 39-46.
[4] Antonine Bordes, Nicolas Usunier, Alberto Garcia-Duran, Jason Weston, and Oksana Yakhnenko, Translating embeddings for modeling multi-relational data, Advances in Neural Information Processing Systems, 2013, 2787-2795.
[5] Zhen Wang, Jianwen Zhang, Jianlin Feng, and Zheng Chen, Knowledge graph embedding by translating on hyperplanes, Proceedings of the Twenty-Eighth AAAI Conference on Artificial Intelligence, 2014, 1112-1119.
[6] Guoliang Ji, Shizhu He, Liheng Xu, Kang Liu, and Jun Zhao, Knowledge graph embedding via dynamic mapping matrix, Proceedings of the 53rd Annual Meeting of the Association for Computational Linguistics and the 7th International Joint Conference on Natural Language Processing, 2015, 687-696.
[7] Dat Quoc Nguyen, Kairit Sirts, Lizhen Qu, and Mark Johnson, STransE: a novel embedding model of entities and relationships in knowledge bases, Proceedings of NAACL HLT 2016, 2016, 460-466.
[8] Guoliang Ji, Kang Liu, Shizhu He, and Jun Zhao, Knowledge graph completion with adaptive sparse transfer matrix, Proceedings of the Thirtieth AAAI conference on artificial intelligence, 2016, 985-991.
[9] Bishan Yang, Wen-tau Yih, Xiaodong He, Jianfeng Gao, and Li Deng, Embedding entities and relations for learning and inference in knowledge bases, 2014, arXiv1412.6575.
[10] Theo Trouillon, Johannes Welbl, Sebastian Riedel, eric Gaussier, and Guillaume Bouchard, Complex embeddings for simple link prediction, Proceedings of Machine Learning Research, 2016.
[11] Dai Quoc Nguyen, Thanh Vu, Tu Dinh Nguyen, Dat Quoc Nguyen, and Dinh Phung, A capsule network-based embedding model for knowledge graph completion and search personalization, Proceedings of NAACL-HLT 2019, 2019, 2180-2189.
[12] Sara Sabour, Nicholas Frosst, and Geoffrey E. Hinton, Dynamic routing between capsules, NIPS 2017, 2017, 3857-3867.
[13] Geoffrey Hinton, Sara Sabour, and Nicholas Frosst, Matrix capsules with EM routing, ICLR, 2018, 1-15.
[14] Yao-Huang Hubert Tsai, Nitish Srivastava, Hanlin Goh, and Ruslan Salakhutdinov, Capsules with inverted dot-product attention routing, 2020, arXiv:2002.04764.
[15] Wei Zhao, Haiyun Peng, Steffen Eger, Erik Cambria, and Min Yang, Towards scalable and reliable capsule networks for challenging NLP applications, 2019, 1549-1559.
[16] Zhuang Chen, and Tieyun Qian, Transfer capsule network for aspect level sentiment classification, Proceedings of the 57th Annual Meeting of the Association for Computational Linguistics, 2019, 547-556.
[17] Wei Zhao, Jianbo Ye, Min Yang, Zeyang Le1, Soufe1, and Zhou Zhao, Investigating capsule networks with dynamic routing for text classification, Proceedings of the 2018 Conference on Empirical Methods in Natural Language Processing, 2018, 3110-3119.

[18] Juho Lee, Yoonho Lee, Jungtaek Kim, Adam R. Kosiorek, Seungjin Choi, and Yee Whye Teh, Set Transformer: a framework for attention-based permutation-invariant neural networks, Proceedings of the 36$^{th}$ International Conference on Machine Learning, 2019.

[19] Ashish Vaswani et al., Attention is all you need, NOIOS 2017, 2017, 5999-6009.

[20] Jimmy Lei Ba, Jamie Ryan Kiros, and Geoffrey E. Hinton, Layer normalization, 2016, arXiv:1607.06450.

What is claimed is:

1. A system for knowledge graph construction, wherein the system comprises a computing device, the computing device comprises a processor and a storage device storing computer executable code, and the computer executable code, when executed at the processor, is configured to:

provide a first number of entities, a second number of relations, and a plurality of documents, each of the plurality of documents comprising at least one sentence;

convert each of the at least one sentence into a third number of sentence embeddings;

form primary capsules for a capsule neural network, wherein each of the primary capsules is one of the third number of sentence embeddings;

use a set transformer to learn the entities and the relations contained in the provided documents from the primary capsules, so as to obtain entity capsules and relation capsules, an i-th entity and a j-th entity from the entity capsules and an m-th relation from the relation capsules form a head entity-tail entity-relation triple;

project the i-th entity in an entity space into a m-th relation space to form an i-th projection, project the j-th entity in the entity space into the m-th relation space to form a j-th projection, and determine the m-th relation exists for the i-th entity and the j-th entity if a sum of the i-th projection and the m-relation substantially equals to the j-th projection; and construct the knowledge graph using the determined m-th relation, wherein the computer executable code is configured to convert each of the at least one sentence into the third number of sentence embeddings by:

encoding tokens in the at least one sentence into a plurality of one-hot vectors, each of the plurality of one-hot vectors corresponding to one of the tokens in the at least one sentence, wherein the tokens comprise words and punctuations;

embedding each of the plurality of one-hot vectors into a word embedding;

performing LSTM on the word embeddings to obtain a plurality of feature vectors, each feature vector corresponding to one of the tokens in the at least one sentence; and performing a self-structure attention on the plurality of feature vectors to obtain the third number of sentence embeddings, wherein the set transformer comprises an encoder and decoder, the encoder is configured to encode the primary capsules to obtain encoded primary capsules, and the decoder is configured to use the encoded primary capsules, entity seed embeddings and relation seed embeddings to calculate and obtain the entity capsules and the relation capsules, and wherein a number of the entity seed embeddings is equal to a number of the entity capsules, and a number of the relation seed embeddings is equal to a number of the relation capsules.

2. The system of claim 1, wherein the encoder comprises a plurality of self-attention blocks (SABs), and the decoder comprises a pooling by multi-head attention block (PMA) and a plurality of SBAs.

3. The system of claim 1, wherein the computer executable code is configured to project the i-th entity and the j-th entity into the m-th relation space using a projection matrix, and the projection matrix is learned during training.

4. The system of claim 1, wherein the step of embedding each of the plurality of one-hot vectors into the word embedding is performed using word2vec.

5. The system of claim 1, wherein the computer executable code is configured to convert each of the at least one sentence into the third number of sentence embeddings by:

encoding tokens in the at least one sentence into a plurality of one-hot vectors, each of the plurality of one-hot vectors corresponding to one of the tokens in the at least one sentence, wherein the tokens comprise words and punctuations;

transforming one-hot vectors by a transformer to obtain a plurality of feature vectors, each feature vector corresponding to one of the tokens in the at least one sentence; and performing a self-structure attention on the plurality of feature vectors to obtain the third number of sentence embeddings.

6. The system of claim 5, wherein the transformer comprises bidirectional encoder representations from transformers (BERT).

7. The system of claim 1, wherein the plurality of documents are product descriptions, the entities are a plurality of products, the relations comprise a fitting relation between the plurality of products, and the computer executable code is further configured to:

upon receiving a query product, query the knowledge graph using the query product to obtain a query entity corresponding to the query product and a fitting entity having the fitting relation to the query entity; and provide a fitting product corresponding to the fitting entity.

8. The system of claim 1, wherein the plurality of documents are product question and answers, the entities are a plurality of product questions and a plurality of product answers, the relations comprise a true relation linking one of the plurality of product answers to one of the plurality of product questions, and the computer executable code is further configured to:

upon receiving a product question, query the knowledge graph using the product question to obtain one of the product question entities, and obtain one of the product answer entities having the true relation to the one of the product question entities; and provide an answer corresponding to the one of the product answer entities.

9. The system of claim 1, wherein the plurality of documents are product service requests and answers, the entities are a plurality of product service request entities and a plurality of product service answer entities, the relations comprise a true relation linking one of the plurality of product service request entities to one of the plurality of product service answer entities, and the computer executable code is further configured to:

upon receiving a product service request, query the knowledge graph using the product service request to obtain one of the product service request entities, and obtain one of the product service answer entities having the true relation to the one of the product service request entities; and provide an answer corresponding to the one of the product service answer entities.

10. A method, comprising:

providing, by a computing device, a first number of entities, a second number of relations, and a plurality of documents, each of the plurality of documents comprising at least one sentence;

converting, by the computing device, each of the at least one sentence into a third number of sentence embeddings;

forming, by the computing device, primary capsules for a capsule neural network, wherein each of the primary capsules is one of the third number of sentence embeddings;

using, by the computing device, a set transformer to learn the entities and the relations contained in the provided documents from the primary capsules, so as to obtain entity capsules and relation capsules, an i-th entity and a j-th entity from the entity capsules and an m-th relation from the relation capsules form a head entity-tail entity-relation triple;

projecting, by the computing device, the i-th entity in an entity space into an m-th relation space to form an i-th projection, projecting the j-th entity in the entity space into the m-th relation space to form a j-th projection, and determining the m-th relation exists for the i-th entity and the j-th entity if a sum of the i-th projection and the m-relation substantially equals to the j-th projection; and constructing the knowledge graph using the determined m-th relation, wherein the step of converting each of the at least one sentence into a third number of sentence embeddings comprises:

encoding tokens in the at least one sentence into a plurality of one-hot vectors, each of the plurality of one-hot vectors corresponding to one of the tokens in the at least one sentence;

embedding each of the plurality of one-hot vectors into a word embedding;

performing LSTM on the word embeddings to obtain a plurality of feature vectors, each feature vector corresponding to one of the tokens in the at least one sentence; and performing a self-structure attention on the plurality of feature vectors to obtain the third number of sentence embeddings, wherein the set transformer comprises an encoder and decoder, the encoder is configured to encode the primary capsules to obtain encoded primary capsules, and the decoder is configured to use the encoded primary capsules, entity seed embeddings and relation seed embeddings to calculate and obtain the entity capsules and the relation capsules, and wherein a number of the entity seed embeddings is equal to a number of the entity capsules, and a number of the relation seed embeddings is equal to a number of the relation capsules.

11. The method of claim 10, wherein the encoder comprises a plurality of self-attention blocks (SABs), and the decoder comprises a pooling by multi-head attention block (PMA) and a plurality of SBAs.

12. The method of claim 10, wherein the step of converting each of the at least one sentence into a third number of sentence embeddings comprises:

encoding tokens in the at least one sentence into a plurality of one-hot vectors, each of the plurality of one-hot vectors corresponding to one of the tokens in the at least one sentence;

transforming one-hot vectors by a transformer to obtain a plurality of feature vectors, each feature vector corresponding to one of the words in the at least one sentence; and performing a self-structure attention on the plurality of feature vectors to obtain the third number of sentence embeddings.

13. The method of claim 10, wherein the plurality of documents are product descriptions, the entities are a plurality of products, the relations comprise fitting between the plurality of products, and the method further comprises:

upon receiving a query product, querying the knowledge graph using the query product to obtain a query entity corresponding to the query product and at least one fitting entity having the fitting relation to the query entity; and providing a fitting product corresponding to the at least one fitting entity.

14. The method of claim 10, wherein the plurality of documents are product questions and answers, the entities are a plurality of product questions and a plurality of product answers, the relations comprise a true relation linking one of the plurality of product answers to one of the plurality of product questions, and the method further comprises:

upon receiving a product question, querying the knowledge graph using the product question to obtain one of the product question entities and obtain one of the product answer entities having the true relation to the one of the product question entities; and providing an answer corresponding to the one of product answer entities.

15. The method of claim 10, wherein the plurality of documents are product service requests and answers, the entities are a plurality of product service request entities and a plurality of product service answer entities, the relations comprise a true relation linking one of the plurality of product service request entities to one of the plurality of product service answer entities, and the method further comprises:

upon receiving a product service request, querying the knowledge graph using the product service request to obtain one of the product service request entities and obtain one of the product service answer entities having the true relation to the one of the product service request entities; and providing an answer corresponding to the one of the product service answer entities.

16. A non-transitory computer readable medium storing computer executable code, wherein the computer executable code, when executed at a processor of a computing device, is configured to:

provide a first number of entities, a second number of relations, and a plurality of documents, each of the plurality of documents comprising at least one sentence;

convert each of the at least one sentence into a third number of sentence embeddings;

form primary capsules for a capsule neural network, wherein each of the primary capsules is one of the third number of sentence embeddings;

use a set transformer to learn the entities and the relations contained in the provided documents from the primary capsules, so as to obtain entity capsules and relation capsules, an i-th entity and a j-th entity from the entity capsules and an m-th relation from the relation capsules form a head entity-tail entity-relation triple;

project the i-th entity in an entity space into a m-th relation space to form an i-th projection, project the j-th entity in the entity space into the m-th relation space to form a j-th projection, and determine the m-th relation exists for the i-th entity and the j-th entity if a sum of the i-th projection and the m-relation substantially equals to the j-th projection; and construct the knowledge graph using the determined m-th relation, wherein the computer executable code is configured to convert each of the at least one sentence into the third number of sentence embeddings by:

encoding tokens in the at least one sentence into a plurality of one-hot vectors, each of the plurality of one-hot vectors corresponding to one of the tokens in the at least one sentence, wherein the tokens comprises words and punctuations;

embedding each of the plurality of one-hot vectors into a word embedding;

performing LSTM on the word embeddings to obtain a plurality of feature vectors, each feature vector corresponding to one of the tokens in the at least one sentence; and performing a self-structure attention on the plurality of feature vectors to obtain the third number of sentence embeddings, wherein the set transformer comprises an encoder and decoder, the encoder is configured to encode the primary capsules to obtain encoded primary capsules, and the decoder is configured to use the encoded primary capsules, entity seed embeddings and relation seed embeddings to calculate and obtain the entity capsules and the relation capsules, and wherein a number of the entity seed embeddings is equal to a number of the entity capsules, and a number of the relation seed embeddings is equal to a number of the relation capsules.

17. The non-transitory computer readable medium of claim 16, wherein the encoder comprises a plurality of self-attention blocks (SABs), and the decoder comprises a pooling by multi-head attention block (PMA) and a plurality of SBAs.

* * * * *